June 21, 1955          W. H. ROUSE          2,711,462

ADJUSTABLE MOUNTING MEANS FOR ELECTRICAL CONTROL DEVICES

Filed Nov. 26, 1952          2 Sheets-Sheet 1

Inventor
William H. Rouse
By W. E. Lyon
Attorney

June 21, 1955     W. H. ROUSE     2,711,462
ADJUSTABLE MOUNTING MEANS FOR ELECTRICAL CONTROL DEVICES
Filed Nov. 26, 1952     2 Sheets-Sheet 2
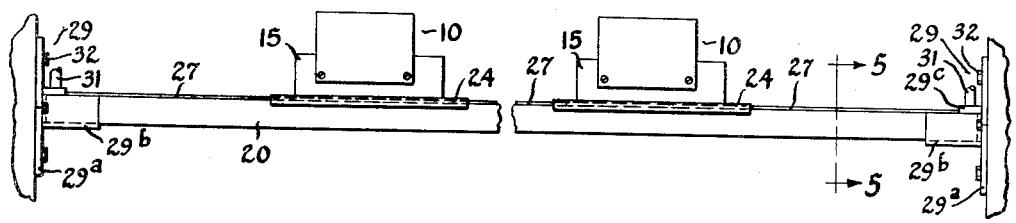
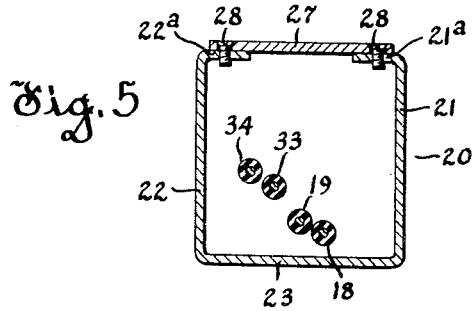
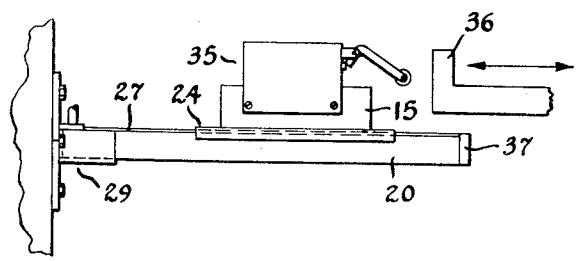
Inventor
William H. Rouse

United States Patent Office 2,711,462
Patented June 21, 1955

2,711,462

ADJUSTABLE MOUNTING MEANS FOR ELECTRICAL CONTROL DEVICES

William H. Rouse, Greenfield, Wis., assignor to Cutler-Hammer, Inc., Milwaukee, Wis., a corporation of Delaware Application November 26, 1952, Serial No. 322,786

7 Claims. (Cl. 200—168)

This invention relates to means affording adjustable mounting of electrical control devices on, or in relation to, machines requiring adjustment in the position of such devices.

Monitoring electrical control devices, such as for example, paper-break switches, limit switches, photocells and light sources, are in many cases required to have adjustable mounting on, or in relation to, machines or parts thereof whose operation they are called upon to monitor. It is a primary object of the present invention to provide improved adjustable mounting means for such electrical control device, and Another object is to provide mounting means of the aforementioned character which affords ready repositioning of electrical control devices, together with enclosure and support of electrical wiring connecting with such control devices.

Other objects and advantages of the invention will hereinafter appear.

The accompanying drawings illustrate certain preferred embodiments of the invention which will now be described, it being understood that the embodiments illustrated may be modified in respect of details without departing from the scope of the appended claims.

In the drawings,

Fig. 4 is a more or less schematic view in side elevation of a complete mounting means and a plurality of paper-break switches carried thereby;

Fig. 5 is a view taken along the line 5—5 of Fig. 4, and

Fig. 6 is a view of a side elevation of a modified form of mounting means for a limit switch.

Figure 1:
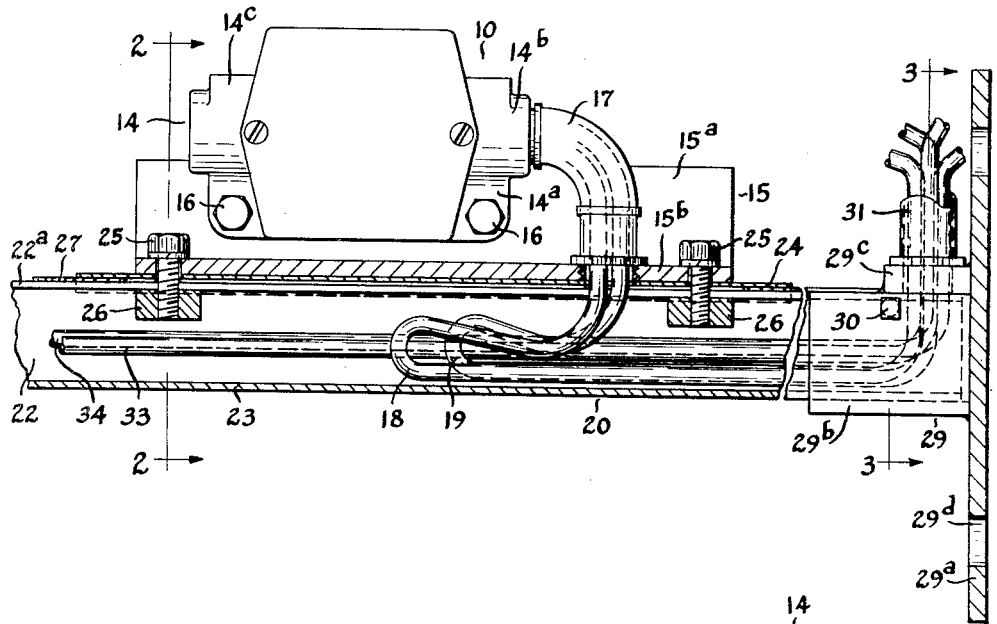
Figure 1 is a view in side elevation of a paper-break switch together with portions of an improved mounting means therefor with certain parts of the latter shown in section.
Figure 2:
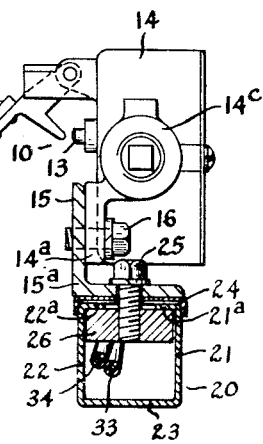
Fig. 2 is a view taken along the line 2—2 of Fig. 1.
Figure 3:
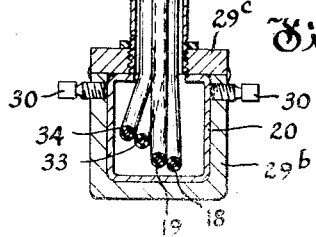
Fig. 3 is a view taken along the line 3—3 of Fig. 1.

Referring to Figs. 1 and 2, they show a paper-break switch 10, comprising a web engaging shoe 11, actuating lever 12, switch actuator 13 and a housing 14 for the electrical commutating mechanism (not shown). Housing 14 is provided with a substantially at, rectangular mounting base 14$^a$ and internally threaded cross portions 14$^b$ and 14$^c$.

Switch 10 is mounted on the vertical leg 15$^a$ of a right-angle bracket 15 by means of cap screws 16 which penetrate receiving openings in portion 14$^a$ and take into alined threaded openings in leg 15$^a$. With the preferred form of switch shown, electrical wiring, comprising conductors 18 and 19, enters housing 14 through a conduit elbow 17 screw threaded into boss 14$^b$ and a threaded receiving opening extending through the horizontal leg 15$^b$ of bracket 15.

Bracket 15 is adjustably mounted on the open side of a substantially U-shaped channel member 20, which is provided with side walls 21 and 22; and an interconnecting wall 23. Flange portions 21$^a$ and 22$^a$ of walls 21 and 22, respectively, extend toward each other and lie in a common plane along the open side of member 20. A plate member 24, having down-turned longitudinal edges, is adapted to overlie a portion of the open side of member 20, intermediate the latter and the lower surface of the leg 15$^b$ of bracket 15. Bolts 25 which penetrate alined openings in leg 15$^b$ and member 24 and take into nuts 26 located inside member 20, adjustably secure bracket 15 and member 24 in position on member 20. Member 24 is preferably made longer than bracket 15 so that it extends somewhat beyond the ends of the latter.

As best shown in Figs. 1 and 5, the greater portion of the open side of channel member 20 is closed by one or more plates 27 which overlie and seat on the upper surfaces of portions 21$^a$ and 22$^a$ of walls 21 and 22 of member 20. The plates 27 are secured in place by flat head screws 28 penetrating counter-sunk openings in the plate and taking into threaded openings spaced at regular intervals along the portions 21$^a$ and 22$^a$. After a desired position longitudinally on member 20 is determined for switch 10, bracket 15 and member 24, the plates 27 are screwed in position so that ends of plates adjacent bracket 15 are overlapped by portions of member 24 and then bracket 15 is secured in place.

As shown in Figs. 1 and 4, member 20 is depicted as being disposed in transverse relation to a traveling web in a printing press. For supporting and securing member 20 in such relation to the side frames of the press there are provided end brackets 29. Each of the brackets 29 is provided with a flat rectangular portion 29$^a$ and a channel portion 29$^b$ secured to and extending at a right angle from portion 29$^b$. The inside of portion 29$^b$ is so dimensioned that channel member 20 will fit therein with a minimum of clearance. Member 20 is secured within portion 29$^b$ by set screws 30. Brackets 29 each have secured to the open sides of their channel portions 29$^b$, a flat plate 29$^c$ which is provided with a threaded opening extending therethrough. As best shown in Fig. 1, a conduit 31 is adapted to threadedly engage within the opening in portion 29$^c$. The portions 29$^a$ of brackets 29 are provided with a plurality of screw receiving openings 29$^d$ (see Fig. 1), and as shown in Fig. 4 cap screws 32 are adapted to penetrate such openings and take into threaded openings or recesses in the side frames of the printing press.

As shown in Fig. 1, conductors 18 and 19 extend through member 20, wherein they are afforded closed-in support, into conduit 31, through which they may be assumed to extend to other associated electrical control apparatus. In order to facilitate future repositioning of bracket 15 and switch 10 on member 20, it is desirable to provide conductors 18 and 19 with a certain amount of slack to be stowed within member 20. The additional pair of conductors 33 and 34 extending through conduit 31 and member 20 may be assumed to connect with another switch 10, mounted in spaced apart relation along member 20 (See Fig. 4). While the mounting means aforedescribed have been shown in connection with a paper-break switch of one preferred form, it will be apparent that such mounting means is not limited to use with such form of paper-break switch or to the form shown for bracket 15. In fact, it is apparent that in certain instances bracket 15 could be dispensed with altogether. It is further apparent that in securing the assembly comprising switch 10, bracket 15 and plate 24 in place on member 20, a single plate having a longitudinal dimension in excess of the spacing between bolts 25, and threaded openings therein to accommodate each of the bolts 25 could be used in lieu of the two nuts 26.

Fig. 6 shows a modified form of mounting means used for adjustably supporting a limit switch 35 in relation to traveling member 36 which may be assumed to travel in a straight line in reverse directions. The mounting means in this instance dispenses with one end support bracket 29 and the free end of member 20 is closed by an end closure member 37 which fits over the end of member 20.

While in both forms of the mounting means hereinbefore disclosed the channel 20 is depicted as disposed in a horizontal plane and support brackets 29 secured to vertical members, it will be appreciated that their use is not limited to such particular disposition, and may be disposed as the particular application demands. It is apparent that the brackets 29 can be modified in various ways so that member 20 can be so disposed that a control device mounted thereon can be adjusted as desired with respect to the item it is called upon to monitor.

I claim:

1. For adjustably mounting an electrical control device, in combination, a channel member provided with side walls and an interconnecting wall and having said side walls turned inwardly at its open side to provide longitudinal flanges, means for mounting a control device on the open side of said channel comprising a member having a flat portion overlying a portion of the open side of said channel and parallel depending edge portions straddling adjacent side wall portions of said channel, said flat portion having an opening therein communicating with the open side of said channel for passage of electrical conductors therethrough, screw threaded elements penetrating receiving openings therefor in said flat portion of the last mentioned member and extending into the open side of said channel and complementally threaded means underlying the flanges of said channel with which said elements threadedly engage to adjustably secure said last mentioned member in position longitudinally on said channel, and one or more plates overlying the open side of said channel and removably secured to said flanges thereof to provide, in cooperation with said channel and said last mentioned member, an enclosed duct for concealing and supporting electrical conductors connecting with a control device which may be carried on said last mentioned member.

2. For adjustably mounting an electrical control device, in combination, a channel member provided with side walls and an interconnecting wall and having said side walls turned inwardly at its open side to provide longitudinal flanges, means for mounting a control device on the open side of said channel member comprising a member having a flat portion overlying a portion of the open side of said channel and parallel depending edge portions straddling adjacent side wall portions of said channel, a bracket for mounting of a control device thereon provided with a flat portion overlying the flat portion of the last mentioned member, said flat portions having alined openings therein communicating with the open side of said channel for passage of electrical conductors therethrough, screw threaded elements penetrating receiving openings therefor in said flat portions of said bracket and said last mentioned member into the open side of said channel and complementally threaded means underlying the flanges of said channel with which said elements threadedly engage to adjustably secure said bracket and said last mentioned member in position longitudinally on said channel, and one or more plates overlying the open side of said channel and removably secured to said flanges thereof to provide, in cooperation with said channel and said last mentioned member, an enclosed duct for concealing and supporting electrical conductors connecting with a control device which may be carried on said last mentioned member.

3. For adjustably mounting an electrical control device, in combination, a channel member provided with side walls and an interconnecting wall and having said side walls turned inwardly at its open side to provide longitudinal flanges, means for mounting a control device on the open side of said channel member comprising a member having a flat portion overlying a portion of the open side of said channel and parallel depending edge portions straddling adjacent side wall portions of said channel, a bracket for mounting of a control device thereon provided with a flat portion overlying the flat portion of the last mentioned member, said flat portions having alined openings therein communicating with the open side of said channel for passage of electrical conductors therethrough, screw threaded elements penetrating receiving openings therefor in said flat portions of said bracket and said last mentioned member into the open side of said channel and complementally threaded means underlying the flanges of said channel with which said elements threadedly engage to adjustably secure said bracket and said last mentioned member in position longitudinally on said channel, at least one end support bracket for said channel having a portion in which said channel adjacent an end thereof is seated and secured and having a portion for attachment to a frame of a machine or the like, and one or more plates overlying the open side of said channel and removably secured to said flanges thereof to provide, in cooperation with said channel and said last mentioned member, an enclosed duct for concealing and supporting electrical conductors connecting with a control device which may be carried on said last mentioned member.

4. For adjustably mounting an electrical control device, in combination, a channel member provided with side walls and an interconnecting wall and having said side walls turned inwardly at its open side to provide longitudinal flanges, means for mounting a control device on the open side of said channel member comprising a member having a flat portion overlying a portion of the open side of said channel and parallel depending edge portions straddling adjacent side wall portions of said channel, a bracket for mounting of a control device thereon provided with a flat portion overlying the flat portion of the last mentioned member, said flat portions having alined openings therein communicating with the open side of said channel for passage of electrical conductors therethrough, screw threaded elements penetrating receiving openings therefor in said flat portions of said bracket and said last mentioned member into the open side of said channel and a corresponding number of nuts underlying the flanges of said channel with which said elements threadedly engage to adjustably secure said bracket and said last mentioned member in position longitudinally on said channel, at least one end support bracket for said channel having a portion in which said channel adjacent an end thereof is seated and secured and having a portion for attachment to a frame of a machine or the like, and one or more plates overlying the open side of said channel and removably secured to said flanges thereof to provide, in cooperation with said channel and said last mentioned member, an enclosed duct for concealing and supporting electrical conductors connecting with a control device which may be carried on said last mentioned member.

5. For adjustably mounting an electrical control device, in combination, a channel member provided with side walls and an interconnecting wall and having said side walls turned inwardly at its open side to provide longitudinal flanges, means for mounting a control device on the open side of said channel member comprising a member having a flat portion overlying a portion of the open side of said channel and parallel depending edges portions straddling adjacent side wall portions of said channel, a bracket for mounting of a control device thereon provided with a flat portion overlying the flat portion of the last mentioned member, said flat portions having alined openings therein communicating with the open side of said channel for passage of electrical conductors therethrough, screw threaded elements penetrating receiving openings therefor in said flat portions of said bracket and said last mentioned member into the open side of said channel and a corresponding number of nuts underlying the flanges of said channel with which said elements threadedly engage to adjustably secure said bracket and said last mentioned member in position longitudinally on said channel, at least one end support bracket for said channel provided with a complementally formed channel portion in which said channel is seated and secured adjacent an end thereof, a portion overlying in part the open side of said channel portion and having a conduit receiving opening communicating with said channel portion and a portion for attachment to the frame of a machine or the like, and one or more plates overlying the open side of said channel member and removably secured to the flanges thereof to provide, in cooperation with said channel, said last mentioned member and said end support bracket, an enclosed wire-way for concealing and supporting electrical conductors connecting with a control device which may be mounted on the first mentioned bracket.

6. The combination with a web printing press or the like and an electrical control device therefor, of a channel member provided with side walls and an interconnecting wall and having said side walls turned inwardly at its open side to provide longitudinal flanges, a pair of end brackets for supporting said channel across the path of a web, each being provided with a complementally formed channel portion in which said channel adjacent an end thereof is seated and secured and a portion attachable to a side frame of the press a member having a flat portion overlying a portion of the open side of said channel and parallel depending edge portions straddling adjacent side wall portions of said channel, said flat portion having an opening therein communicating with the open side of said channel, means supporting said control device on said member, screw threaded elements penetrating receiving openings therefor in the last mentioned member and extending into the open side of said channel, complementally threaded means underlying the flanges of said channel with which said elements threadedly engage to adjustably secure said last mentioned member in position longitudinally on said channel, and one or more plates overlying the open side of said channel and removably secured to said flanges thereof to provide, in cooperation with said channel and said last mentioned member, an enclosed duct for concealing and supporting electrical conductors connecting with a control device which may be carried on said last mentioned member.

7. The combination with a machine part movable in reverse directions, of a limit switch, means for adjustably mounting said limit switch in operative relation to said machine part comprising a channel member provided with side walls and an interconnecting wall and having said side walls turned inwardly at its open side to provide longitudinal flanges, an end support bracket for said channel provided with a complementally formed channel portion in which said channel adjacent one end thereof is seated and secured and a portion attachable to the frame of the machine, a member affording support of said switch having a flat portion overlying a portion of the open side of said channel and parallel depending edge portions straddling adjacent side walls of said channel, said flat portion having an opening therein communicating with the open side of said channel for passage of electrical conductors connecting with said limit switch, screw threaded elements penetrating receiving openings in the last mentioned member and extending into the open side of said channel, complementally threaded means underlying the flanges of said channel with which said elements are threadedly engaged to adjustably secure said member in position longitudinally on said channel, a member fitting over the other end of said channel to close the same, and one or more plates overlying the open side of said channel and removably secured to the flanges thereof to provide an enclosed duct for concealing and supporting electrical conductors connecting with said limit switch.

References Cited in the file of this patent
UNITED STATES PATENTS

| | | |
|---|---|---|
| 1,582,927 | Hentschell et al. | May 4, 1926 |
| 2,441,522 | Vossen | May 11, 1948 |